SUPERCONDUCTING CIRCUIT COMPONENTS AND METHOD FOR USE AS TRANSDUCING DEVICE

Filed Feb. 17, 1964

ROBERT C. JAKLEVIC
JOHN J. LAMBE
JAMES E. MERCEREAU
ARNOLD H. SILVER
INVENTORS

BY John R. Faulkner
Keith L. Zerschling
ATTORNEYS

United States Patent Office 3,363,200

Patented Jan. 9, 1968

3,363,200

SUPERCONDUCTING CIRCUIT COMPONENTS AND METHOD FOR USE AS TRANSDUCING DEVICE

Robert C. Jaklevic, Detroit, John J. Lambe, Birmingham, James E. Mercereau, Dearborn, and Arnold H. Silver, Farmington, Mich., assignors to Ford Motor Company, Dearborn, Mich., a corporation of Delaware Filed Feb. 17, 1964, Ser. No. 345,257
6 Claims. (Cl. 332—51)

This invention relates to superconductive circuit components and more particularly to superconductive circuit components that may be employed as amplifiers, magnetometers and computing elements.

In the invention, a pair of junctions formed by a sandwich of very thin insulating film positioned between two superconductive elements are connected in parallel through the use of superconductive material. This structure is formed in a loop or ring that encloses a space capable of supporting a magnetic field. An external source of electrical energy or current is connected to the superconductive elements of the loop to force current through the parallel connected junctions. Means are positioned adjacent the loop or ring for producing a magnetic field that may be of a time varying nature. This means may take the form of a coil of wire or other conductor that is supplied electrical energy by means of a current source. This means preferably is positioned to produce a magnetic field in a direction perpendicular to the plane of the loop or ring formed by the superconductive elements and junctions.

It has been found that the dissipationless current flow through the device is a function of the flux in the area enclosed by the loop or ring.

This current, which is the current through the junctions, is a periodic function of the magnetic field present in the area enclosed. As the magnetic field is increased, this current through the junctions and hence in the external circuit connecting the superconductors periodically rises and falls as a function of the magnetic field and the period corresponds to a small unit of flux of the order of $2 \times 10^{-7}$ gauss cm.$^2$. The period in applied magnetic field will be inversely proportional to the area enclosed by the above described loop. With an enclosed area in the ring or loop of a few hundredths of a square millimeter this period will be a few milligauss. By varying the magnetic field, hundreds of periods can be observed. This novel behavior makes possible a number of applications described below:

Since the magnetic field necessary to produce each period of modulation can be made quite small by a suitably large enclosed area, the superconducting circuit element can be used as an amplifier. The input is the coil current producing the magnetic field and the output is the modulated current flowing through the two junctions and in the external circuit. Current gains of $10^4$ have been measured.

Because of the extreme sensitivity of modulation to the applied magnetic field, the above described superconducting circuit element will function as a very sensitive magnetometer.

The superconducting circuit element described above can also be made to serve as a computing element. For example, this circuit element will serve as a multiplying element if a sinusoidal magnetic field of amplitude $\Delta H$ and frequency $f$ is applied. The number of periods per second, or roughly frequency, of modulated current in the two junctions and the external circuit connected thereto is proportional to the amplitude of the magnetic field times its frequency.

An object of the present invention is the provision of a novel superconducting circuit element.

A further object of the invention is the provision of a novel superconducting circuit element that is capable of high current amplification.

Another object of the invention is the provision of a superconductive circuit element that is capable of operating as a multiplying element.

A further object of the invention is the provision of a superconducting circuit element that is capable of functioning as a very sensitive magnetometer.

Other objects and attendant advantages of the present invention can be more fully appreciated when the specification is considered in connection with the attached drawings in which FIGURE 1 is a circuit diagram of the invention;

Figure 1:
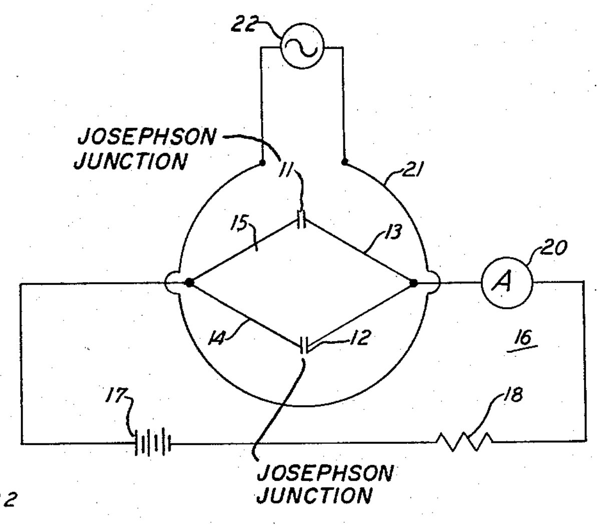

Referring now to the drawings in which like reference numerals designate like parts throughout the several views thereof, there is shown in FIGURE 1 a circuit diagram of the present invention. In this invention a first junction 11 and a second junction 12 are connected in parallel by means of a first superconducting element or means 13 and a second superconducting element or means 14. The junctions 11 and 12 are of the type known as Josephson junctions, described in Physics Letters, vol. 1, No. 7, July 1, 1962. Each of these junctions is formed by sandwiching a very thin insulating film between two superconductive elements. These superconducting elements may take the form of thin films as described more specifically subsequently. In the example shown, the superconductive elements 13 and 14 provide the superconductive material for the junctions 11 and 12. This will be described and explained later in connection with a description of FIGURE 3.

The junctions 11 and 12 and the superconductive elements 13 and 14 are formed in a loop or ring that encloses a space 15. This space must be capable of supporting a magnetic field and hence any type of insulating material, for example, air or plastic material, may be used to fill this space. The superconductive elements 13 and 14 are connected to an external circuit 16 that includes a source of electrical energy 17 and a resistor 18 for limiting current flow. The source of electrical energy 17 provides a means for causing current flow through the superconductive elements 13 and 14 and through the junctions 11 and 12. A current measuring device 20 is shown that is used to measure this dissipationless current flow.

Figure 2:
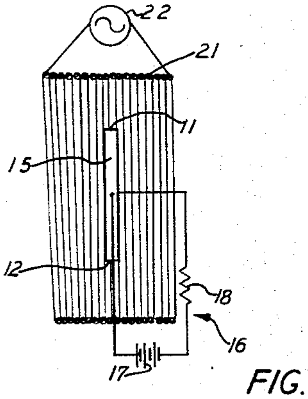
FIGURE 2 is a side sectional view partially in elevation showing certain structural features of the circuit of FIGURE 1.

Means are provided to establish a magnetic field within the space 15 enclosed by the junctions 11 and 12 and the superconductive elements 13 and 14. This means may take the form of a coil 21 that is connected to a source of electrical energy 22. This source of electrical energy 22 may be a source of current that is capable of producing a time varying output. It is preferred that the flux or magnetic field in the space 15 be perpendicular to the plane of the loop or ring formed by the junctions 11 and 12 and the superconductive elements 13 and 14. To accomplish this end, the axis of the coil 21 should be made parallel to the axis of the loop. One means for doing this is shown in FIGURE 2 in which the coil 21 surrounds the loop composed of the two junctions 11 and 12 and the superconductive elements 13 and 14. It is apparent that this coil is positioned to direct a magnetic field through the loop in a direction substantially perpendicular to the plane of the loop.

Figure 3:
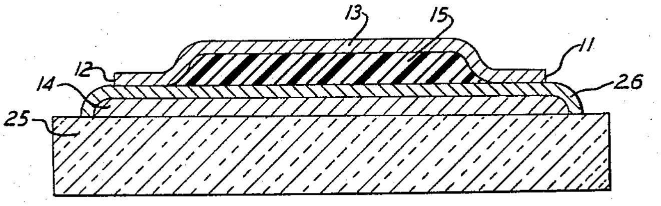
FIGURE 3 is a sectional view through a superconducting device of the present invention.

A physical embodiment of the loop comprised of the junctions 11 and 12 and the superconductive elements 13 and 14 can best be seen by reference to FIGURE 3. In FIGURE 3 the loop which comprises the junction pair 11 and 12 is vacuum deposited on a quartz or other suitable substrate 25. A thin oxide layer 26 separates the superconducting elements 13 and 14 at each end to form the spaced junctions 11 and 12. For example, the superconducting elements 13 and 14 may be thin tin films approximately 1,000 angstroms thick. The thin oxide layer 26 is of tin oxide and may be approximately 25 angstroms in thickness.

In the embodiment shown in FIGURE 3, the space 15 is filled with a Formar insulating material to provide separation of the tin, tin oxide-tin junctions 11 and 12, and to form the loop or ring comprised of the superconductive elements 13 and 14 and the junctions 11 and 12. Thus, the junctions 11 and 12 are connected in parallel by the superconducting thin film links 13 and 14, and these elements form a loop or ring enclosing the area or space 15. It can be readily appreciated by those skilled in the art that the junctions may be constructed from other superconducting materials and insulating material that will separate the junctions.

A twin junction device shown in FIGURE 3 and discussed above, was constructed in which the normal resistance of the junctions 11 and 12 was approximately ½ ohm. The junctions 11 and 12 were spaced approximately 3.5 cm. apart forming the area 15 between the junctions ranging from $10^{-4}$ to $10^{-5}$ cm.$^2$. Many of the junction pairs or loops disclosed in FIGURE 3 have been constructed. The area 15 between the junction was estimated by measurements of the capacity of this area or section assuming a dielectric constant of 3.2 for the former. From this estimated area and other experimental results, it was determined that the flux period as discussed below in relation to FIGURE 4 ranges between $2.5\times10^{-7}$ gauss cm.$^2$ and $1.9\times10^{-7}$ gauss cm.$^2$.

Figure 4:
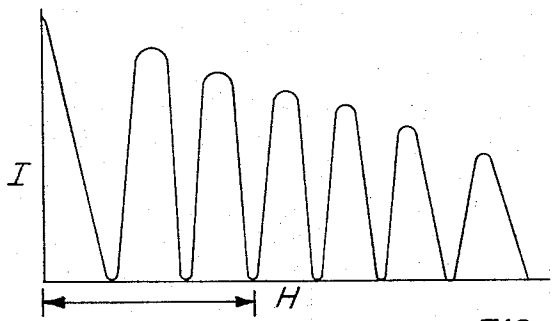
FIGURE 4 is a representative plot of the current through the junctions of the invention as a function of the magnetic field enclosed within the loop formed by the junctions and superconducting means.
Figure 5:
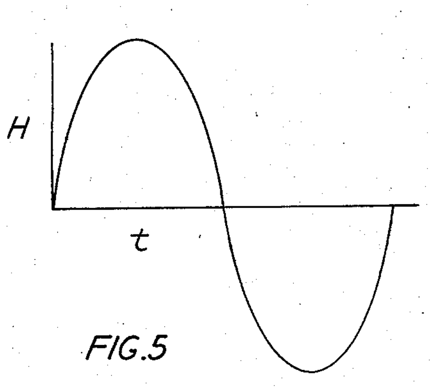
FIGURE 5 is a plot of the variation of the magnetic field contained within the space enclosed by the loop formed by the junctions and superconductive means plotted as a function of time.

Referring now to FIGURE 4, there is shown a representative plot of the dissipationless current flow I through the junctions 11 and 12 as a function of the magnetic field intensity in the space 15. As H is increased, the dissipationless current in the two junctions 11 and 12 alternately goes through a maximum and a minimum. The period of this plot is discussed above in terms of gauss cm.$^2$. If the magnetic field intensity H is periodically altered in accordance with some given function, for example, as a sinusoid as shown in FIGURE 5, the number of periods per second or roughly frequency, of this current through the junctions 11 and 12 as a function of time will be proportional to the product of the amplitude of the varying magnetic field intensity as shown in FIGURE 5 and the frequency of this wave form. For example, if such a sinusoidal wave form in FIGURE 5 is applied by the wave generator 22 to the coil or loop 21, then the number of periods per second or roughly, frequency of the dissipationless current, through the junctions would be proportional to the product of the amplitude of the magnetic field intensity H times the frequency of this wave form.

Figure 6:
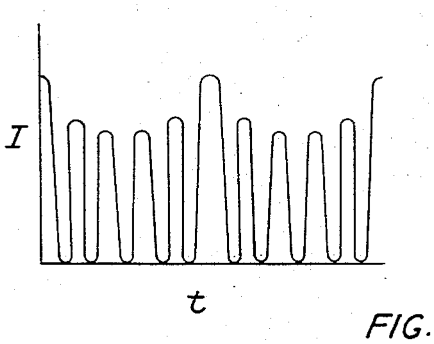
FIGURE 6 is a representative plot of the current though the junctions and the external circuit connecting the junctions as a function of time as a result of the magnetic field shown in FIGURE 5.

This can best be understood by reference to FIGURE 4. In this figure the amplitude of the magnetic field intensity H may be plotted as the abscissa and thus as the amplitude of the magnetic field intensity moves back and forth along the arrows shown the frequency of the dissipationless current through the junctions 11 and 12 will vary as a product of the frequency of the wave form from the source of electrical energy 22 as shown in FIGURE 5 times the amplitude of this wave form. It can be appreciated that the amplitude of H determines the number of times that the wave form shown in FIGURE 4 goes through a minimum in a given time interval. The dissipationless current flow through the junctions 11 and 12 is therefore represented in FIGURE 6, and it can be seen that it is indeed a multiple of the frequency of the applied wave form from the generator 22 and the amplitude of this wave form.

With the device shown in FIGURE 3 and described specifically above connected into the circuit shown in FIGURE 1, current gains of $10^4$ were observed. In determining this current gain the input is the current in the coil 21 producing the magnetic field in the space 15, and the output is the dissipationless current flow through the two junctions 11 and 12. The inventors have constructed a number of the superconducting circuit components as shown and described in this application and have measured the current gains on the order of $10^4$.

As pointed out previously, the superconductive circuit element described above will also function as an extremely sensitive magnetometer and also can serve as a multiplying computer component as discussed previously.

In operation of this superconducting circuit component, the device as shown in FIGURE 3 must be operated at a temperature range in which the superconductivity of the superconductive elements 13 and 14 is present. As is well known in the art, this temperature range is somewhere between 2° and 18° K.

Thus, the present invention provides a novel superconducting circuit component that is capable of use as an amplifier, a magnetometer and a computing element.

It is to be understood that this invention is not to be limited to the exact construction shown and described but that various changes and modifications may be made without departing from the spirit and scope of the invention as defined in the appended claims.

We claim:

1. A superconducting circuit component comprising a first superconducting element and a second superconducting element, said first superconducting element and said second superconducting element formed in a loop to enclose a given area and connected at spaced positions by two very thin insulating films which films are arranged to form Josephson junctions, means connected to said first and said second superconducting element for causing a current to flow through said first and said second superconducting elements and said two very thin insulating films, and means positioned adjacent said loop for producing a magnetic field in said loop in a direction substantially perpendicular to the plane of said loop.

2. A superconducting circuit component comprising a pair of spaced junctions, each of said junctions comprising a sandwich formed of a very thin insulating film positioned between two superconducting elements which film is arranged to form Josephson junctions, said pair of spaced junctions and said superconducting elements connected to form a loop, means connected to said superconducting elements for causing a current to flow through said superconducting element and said spaced junctions, and means positioned adjacent said loop for producing a magnetic field in the area enclosed by said loop.

3. A superconducting circuit component comprising a first junction and a second junction, each of said junctions formed by a very thin insulating film positioned between a first and a second superconducting element and arranged to form Josephson junctions, superconducting means connecting said first junction and said second junction in parallel, said first and said second junction and said superconducting means formed into a loop enclosing a space in which a magnetic field may be produced, means connecting to said superconducting means for causing current to flow in parallel through said first junction and second junctions and means positioned adjacent said loop for producing a magnetic field in said loop.

4. A superconductive circuit component comprising a first junction and a second junction, each of said junctions comprising a first superconductive element and a second superconductive element separated by a very thin film of insulating material said film being arranged to form Josephson junctions, superconductive means connecting said first and said second junctions in parallel, said first and said second junctions and said superconductive means formed into a loop enclosing a space capable of supporting a time varying magnetic field, an external circuit including a source of electrical energy for causing a current to flow through said external circuit and said first and said second junctions in parallel, means positioned adjacent said loop for producing a time varying magnetic field within the space enclosed by said loop, the number of periods per second of the electrical energy in said external circuit being proportional to the product of the amplitude and the frequency of said time varying magnetic field.

5. The method of modulating an electrical current comprising, passing an electrical current in parallel through a pair of spaced junctions formed of superconducting elements separated by a thin insulating film with interconnecting conductive means forming a loop, said film being arranged to form Josephson junctions, maintaining said junctions in a superconductive state, and producing a time varying magnetic field in the area enclosed by said loop.

6. The method of translating information comprising, passing an electrical current in parallel through a pair of spaced junctions formed of superconducting elements separated by a thin insulating film with interconnecting conductive means forming a loop, said film being arranged to form Josephson junctions, maintaining said junctions in a superconductive state, and producing a magnetic field in the area enclosed by said loop.

References Cited

UNITED STATES PATENTS

| | | | |
|---|---|---|---|
| 3,025,416 | 3/1962 | Johnson ----------- | 307—88.5 |
| 3,049,686 | 8/1962 | Walters. | |
| 3,196,412 | 7/1965 | Connell et al. | |

ALFRED L. BRODY, *Primary Examiner.*

ROY LAKE, *Examiner.*